(12) United States Patent
Davies

(10) Patent No.: US 10,203,133 B2
(45) Date of Patent: Feb. 12, 2019

(54) SOLAR ENERGY COLLECTION APPARATUS AND DESIGN METHOD

(71) Applicants: INTEX HOLDINGS PTY LTD, Menindie Gardens, South Australia (AU); Roger Philip Davies, Edwardstown, South Australia (AU)

(72) Inventor: Roger Philip Davies, Edwardstown (AU)

(73) Assignee: Intex Holdings Pty Ltd, Elizabeth Vale, SA (AU)

( * ) Notice: Subject to any disclaimer, the term of this patent is extended or adjusted under 35 U.S.C. 154(b) by 339 days.

(21) Appl. No.: 14/892,730

(22) PCT Filed: May 23, 2014

(86) PCT No.: PCT/AU2014/000543
§ 371 (c)(1),
(2) Date: Nov. 20, 2015

(87) PCT Pub. No.: WO2014/186832
PCT Pub. Date: Nov. 27, 2014

(65) Prior Publication Data
US 2016/0102889 A1    Apr. 14, 2016

(30) Foreign Application Priority Data

May 23, 2013  (AU) ................................ 2013901854
Jul. 29, 2013  (AU) ................................ 2013902808
Jan. 31, 2014  (AU) ................................ 2014900287

(51) Int. Cl.
*F24J 2/16*     (2006.01)
*F24S 23/77*   (2018.01)
(Continued)

(52) U.S. Cl.
CPC .............. *F24S 23/77* (2018.05); *G01B 11/26* (2013.01); *G01J 1/42* (2013.01); *G02B 19/0019* (2013.01);
(Continued)

(58) Field of Classification Search
CPC .. F24J 2/16; F24J 2/18; F24J 2002/108; F24J 2002/1085; H02S 40/22; H02S 40/44; H02S 20/00; F24S 23/77
(Continued)

(56) References Cited

U.S. PATENT DOCUMENTS 3,179,105 A * 4/1965 Falbel .................... F24S 23/00
                                                            126/618
4,171,695 A    10/1979 Sletten
(Continued)

FOREIGN PATENT DOCUMENTS

CN    102759203 A  * 10/2012
GB      1559676 A  *  1/1980 ............... G01K 1/14
(Continued)

OTHER PUBLICATIONS

International Search Report for PCT/AU2014/000543, ISA/AU, Woden ACT, dated Sep. 8, 2014.

*Primary Examiner* — Jorge Pereiro
(74) *Attorney, Agent, or Firm* — Sand & Sebolt

(57) ABSTRACT

The present invention relates to a solar energy collection apparatus and design method. In particular, the invention provides a solar energy collection apparatus incorporating one or more reflectors and a solar collector for receiving incoming solar radiation, including reflected radiation from the one or more reflectors, wherein the one or more reflectors and the collector are oriented according to a pre-calculated offset length and offset angle based at least on the latitude of the apparatus. The invention further provides a (Continued)

computer-implemented method of designing a solar collection apparatus including determining the optimal offset length and offset angle between the one or more reflectors and the collector for a given latitude and other inputs.

15 Claims, 7 Drawing Sheets

(51) Int. Cl.
    *G02B 19/00*     (2006.01)
    *G01B 11/26*     (2006.01)
    *G01J 1/42*     (2006.01)
    *F24S 23/70*     (2018.01)
    *F24S 10/70*     (2018.01)

(52) U.S. Cl.
    CPC .......... *G02B 19/0042* (2013.01); *F24S 10/70* (2018.05); *F24S 2023/876* (2018.05); *F24S 2201/00* (2018.05); *G01J 2001/4266* (2013.01); *Y02B 10/20* (2013.01); *Y02E 10/40* (2013.01)

(58) Field of Classification Search
    USPC ...................................... 73/170.27
    See application file for complete search history.

(56) References Cited

U.S. PATENT DOCUMENTS

| | | | | |
|---|---|---|---|---|
| 4,211,211 A | * | 7/1980 | Toomey | ............ F24S 23/80 |
| | | | | 126/652 |
| 4,572,160 A | * | 2/1986 | Blikken | .............. F24J 2/16 |
| | | | | 126/600 |
| 2011/0079215 A1 | | 4/2011 | Xiang | |

FOREIGN PATENT DOCUMENTS

| | | |
|---|---|---|
| LV | 13371 B | 1/2006 |
| LV | 13711 B | 6/2008 |
| WO | WO-2011/067772 A1 | 6/2011 |

* cited by examiner

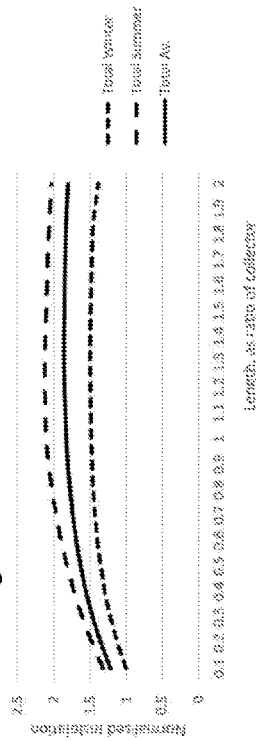
*Fig. 1*
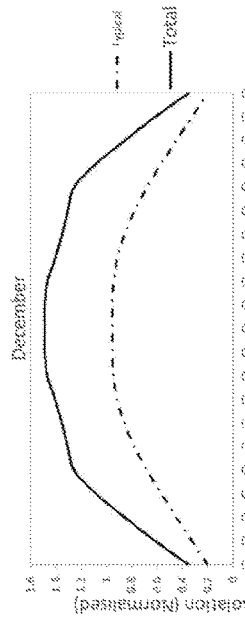
*Fig. 2* Total Summer Insolation vs. Reflector Angle
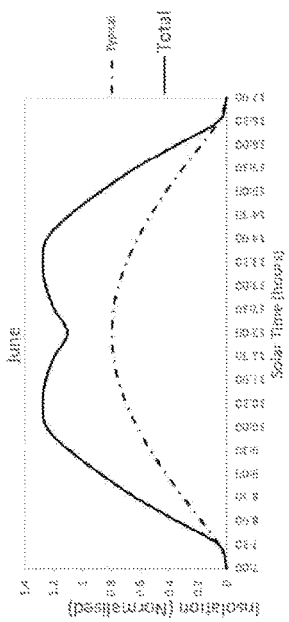
*Fig. 3* Total Winter Insolation vs. Reflector Angle
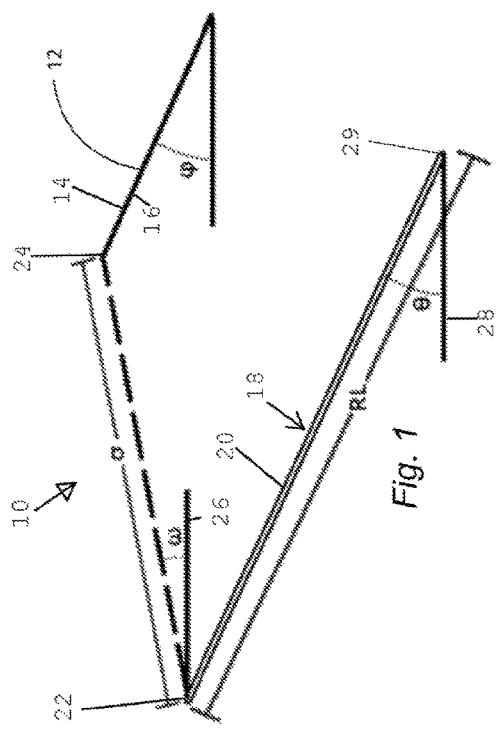
*Fig. 4* Effect of varying offset length
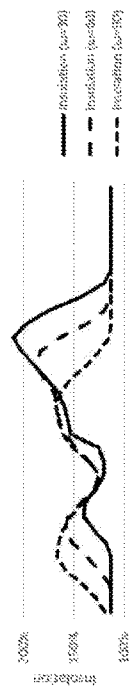
*Fig. 5* One Reflector System at 34°S, Yearly Optimised - Mid-Summer Daily Performance
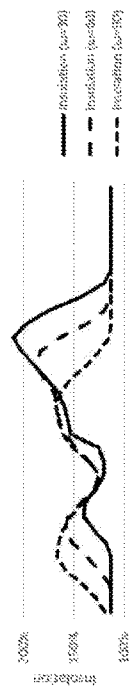
*Fig. 6* One Reflector System at 34°S, Yearly Optimised - Mid-Winter Daily Performance

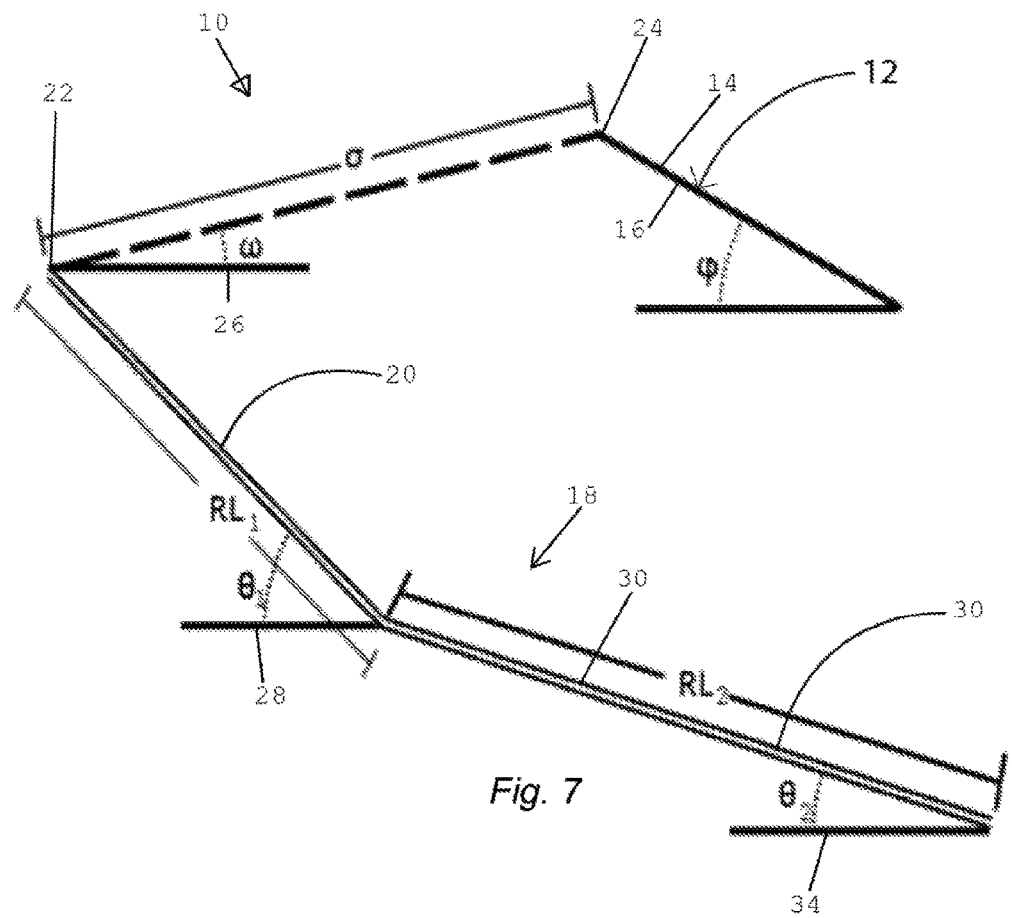
Fig. 7
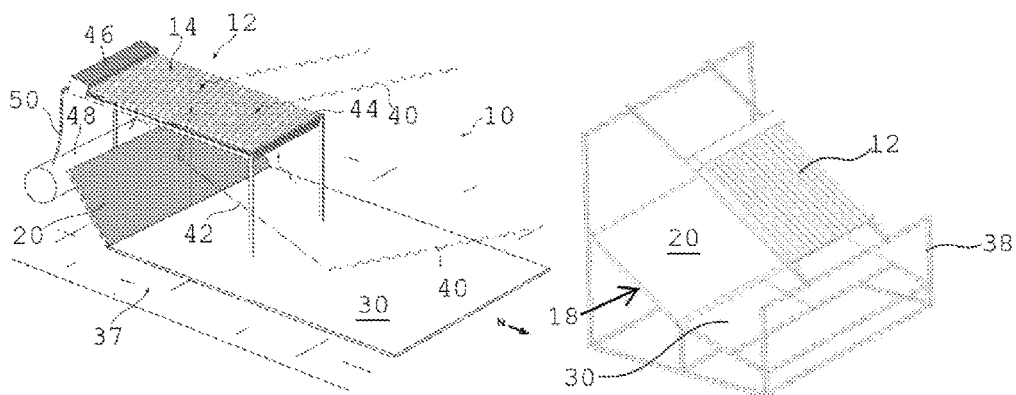
Fig. 8
Fig. 9

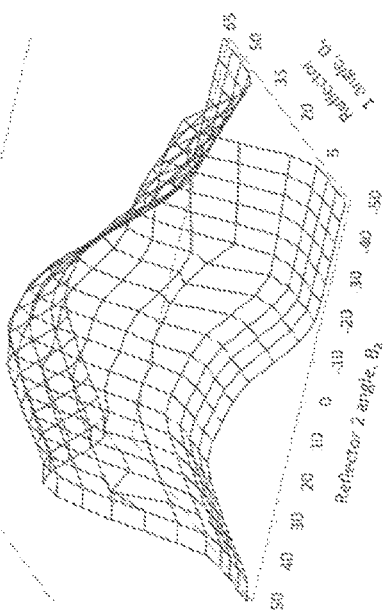
Fig. 15 Insolation vs. Reflector Angles - Summer
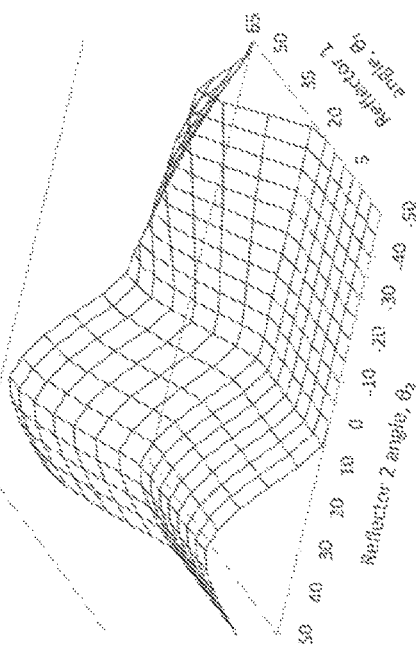
Fig. 16 Insolation vs. Reflector Angles - Winter
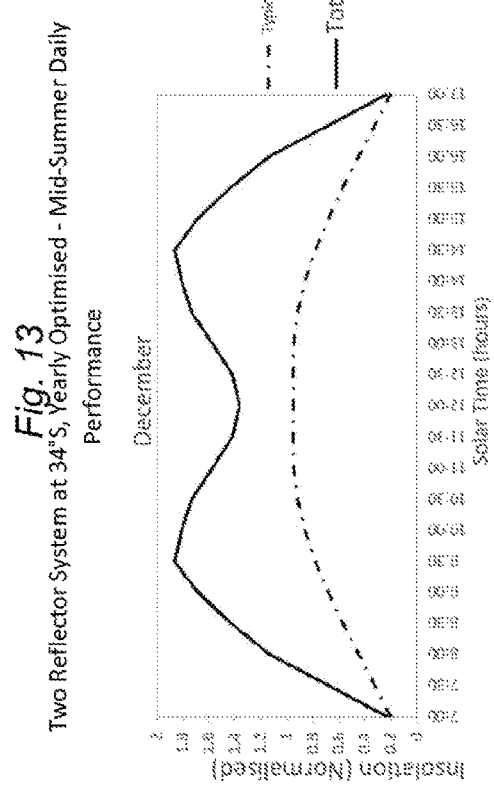
Fig. 13
Two Reflector System at 34°S, Yearly Optimised - Mid-Summer Daily Performance
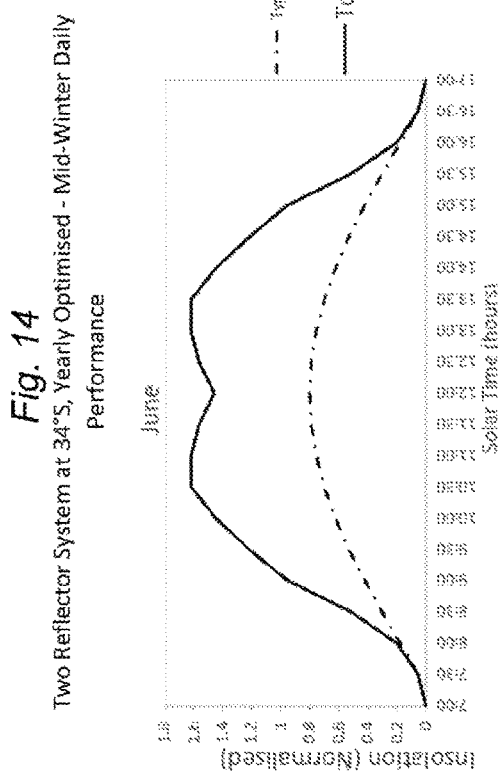
Fig. 14
Two Reflector System at 34°S, Yearly Optimised - Mid-Winter Daily Performance

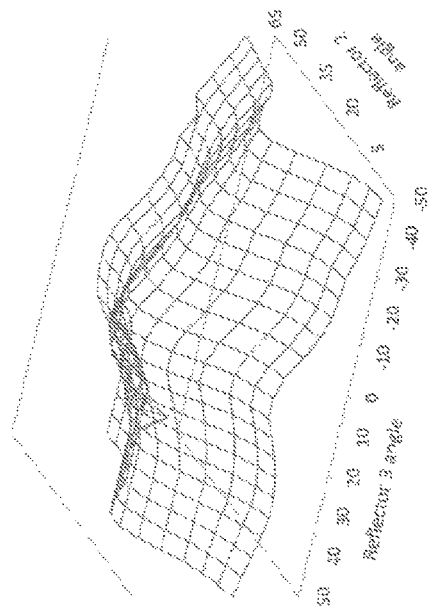
Fig. 20 Three Reflector System at 34°S, Yearly Optimised - Mid-Summer Daily Performance
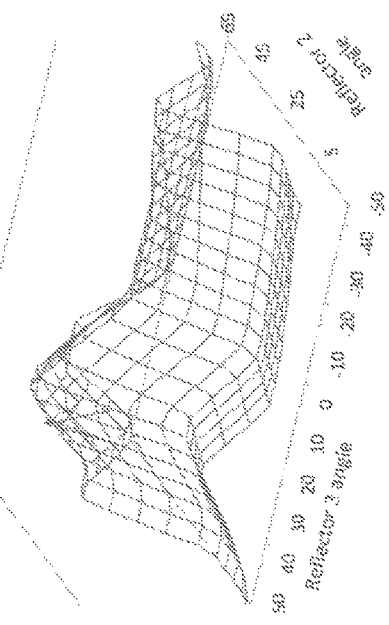
Fig. 21 Three Reflector System at 34°S, Yearly Optimised - Mid-Winter Daily Performance
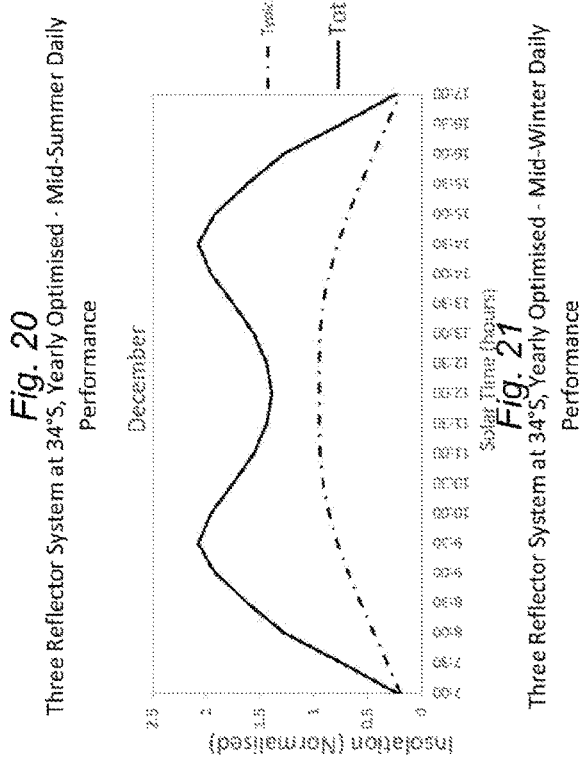
Fig. 22 Insolation vs. Reflector Angles- Summer
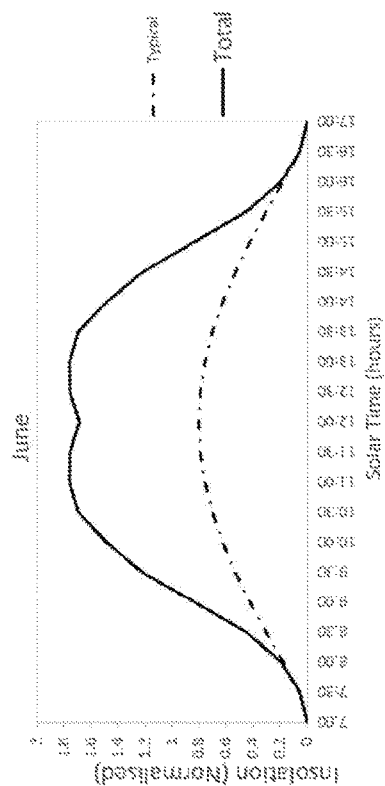
Fig. 23 Insolation vs. Reflector Angles- Winter

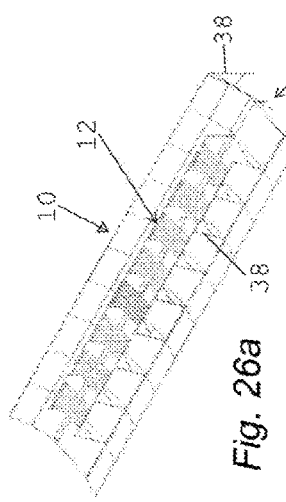
Fig. 26a
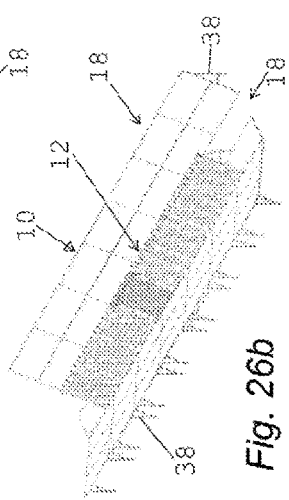
Fig. 26b
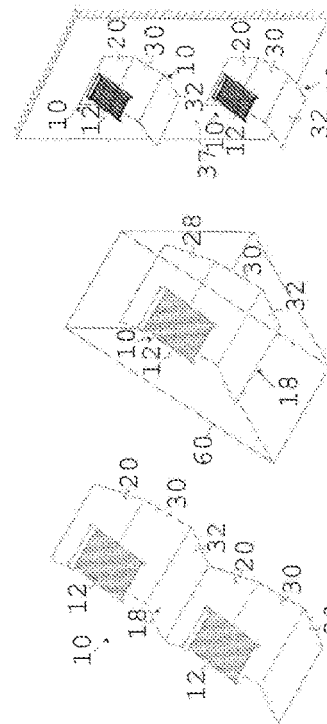
Fig. 27
Fig. 28
Fig. 29
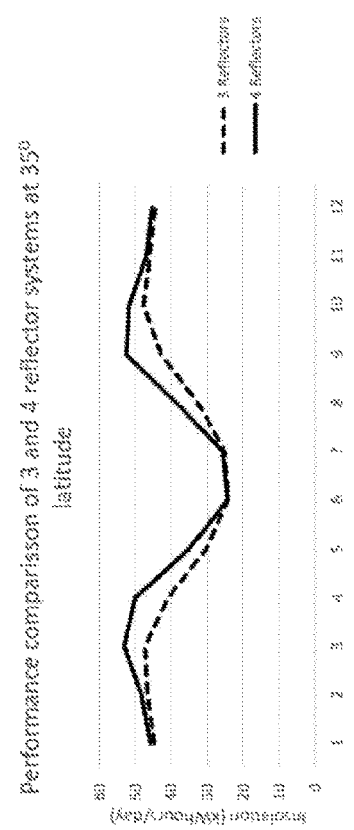
Fig. 24
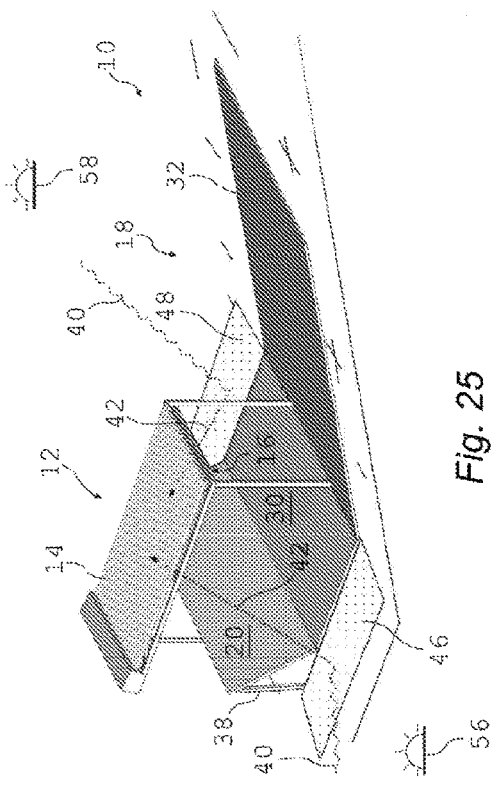
Fig. 25

SOLAR ENERGY COLLECTION APPARATUS AND DESIGN METHOD

CROSS-REFERENCE TO RELATED APPLICATIONS

This application is a 371 U.S. National Stage of International Application No. PCT/AU2014/000543, filed May 23, 2014, which claims the benefit of and priority to Australian Patent Applications Nos. 2013901854, filed May 23, 2013; 2013902808, filed Jul. 29, 2013; and 2014900287, filed Jan. 31, 2014. The entire disclosures of each of the above applications are incorporated herein by reference.

FIELD OF THE INVENTION

The present invention relates in a solar energy collection apparatus and design method. The invention further provides a computer-implemented method of designing a solar collection apparatus.

BACKGROUND TO THE INVENTION

Solar energy collators have been used for many years as a source of renewable energy using solar irradiation, otherwise known as insolation, to heat a fluid passing over a surface or through a conduit, or to provide solar insolation to other devices that collect heat for useful purposes. The collectors are typically supported directly above a roof and are angled by virtue of their mounting, or include frames to angle the collectors appropriately above a horizontal surface. A challenge in this field is to achieve a highly efficient conversion of solar radiation to thermal energy and to increase the temperature of the fluid to an extent that ensures the utility of the fluid is improved for various energy consuming processes.

Solar thermal collection systems typically perform poorly in winter, late autumn and early spring, when users generally seek to consume more or need the most heat for heating systems. The performance of existing solar thermal collection systems is degraded further in the presence of cloud cover, more common in cooler months. In summer, when demand for heat is reduced because of lower losses to ambient in commercial applications, and/or reduced usage of heat in domestic applications, solar thermal collectors perform most effectively, collecting excess heat energy compared with demand.

Typically, there is an excess capacity of summer heating in fixed solar thermal collectors, and a deficit of heat production in colder months. Where sufficient collectors are deployed in a particular setting for collection of heat in cold months, excess heat must be rejected in the warmer months.

The performance of fixed solar thermal collectors in cooler months is also degraded in that the heat output is at a lower temperature, such that the output is not at a sufficient temperature to meet the consumption requirement.

In addition, many apparatus are empirically positioned, namely, with the same collector position and orientation notwithstanding factors such as the time of year. Such apparatus are directed generally towards the incoming solar radiation at peak summer periods. Accordingly, such apparatus are not designed to compensate for the diurnal changes of the sun and variation in the solar azimuth angle throughout the year, that is unless they are physically re-oriented throughout the year. Furthermore, most existing apparatus known to the Applicant use only the upper surface of a collector panel to collect or utilise the solar radiation. Accordingly, the existing apparatus are not particularly efficient in utilising the incoming insolation, which contributes to the aforementioned problems, particularly during the cooler months when the sun is lowest above the horizon.

Attempts to address the above problems have largely been unsuccessful to date. For example, installing more solar collectors for increased production of hot water in winter requires a higher capital cost, and represents a commercially infeasible solution compared to alternate heating methods. An additional problem is the difficulty and expense associated with heat rejection of excess heat collected in summer.

Installation of moving collectors of concentrators to improve winter performance, and allow any necessary redaction in summer heating performance by "de-tuning" of summer thermal collection, has also been attempted. However, this greatly increases the complexity and expense of the systems, and reduces their commercial value, again rendering this a non-commercial solution.

Installation of a heat store able to store heat for up to 5 years, to allow summer time collection and winter time utilization of solar thermal sourced heat has been developed in at least one location in Northern Canada. This solution requires a "whole of village" development, as smaller sized in-ground heat stores are not practicable. This solution is largely impractical as a retrofit installation since extensive pipework is required between the large central heat store and the consumers of energy in other buildings.

There has also been development of apparatus incorporating reflector panels positioned relative to the collector to provide solar energy to the collector not only from direct solar radiation but from reflected radiation via the reflector panels. However, apparatus of this type that are known to the Applicant still employ an empirical design suited to improving efficiency at one particular time of year, that is, they do not include collectors and reflectors oriented relative to one another specifically to ensure optimal performance throughout the year for a given latitude. Accordingly, known apparatus employing reflective panels, whilst successful in increasing efficiency at certain times of day at a particular time of year, still suffer the same performance problems associated with non-reflector collectors at other times of year.

In addition to problems associated with the operation of existing solar energy collection apparatus, the Applicant has also recognized the need to address problems associated with the design of such apparatus. There is no current method known to the Applicant which provides a means of designing a solar energy collection apparatus and in particular an orientation of a collector and one or more reflectors of the apparatus for optimal performance over a selected time of year (or year round) based at least on latitude. Indeed, there are a number of other factors which may influence the design of such apparatus. For example, a large variety of existing rooflines and orientations are typically encountered. In addition, buildings at different latitudes may require a different orientation of systems to achieve optimum performance. In some installations, wintertime heat collection is most important, while summertime heat collection must be reduced to avoid excess energy accumulation. In other installations, maximum energy collection ever the annual cycle is desirable, while in a further scenario, maximum summertime gain is desired. In other situations, the collection space may be restricted and maximum energy collection per square meter is desired.

The object of this invention is to provide a solar energy collection apparatus and design method that alleviates the above problems, or at least provides the public with a useful alternative.

SUMMARY OF THE INVENTION

According to an aspect, the present invention provides a solar energy collection apparatus to increase a quantum of solar radiation incident on a collector of solar energy, said apparatus characterised by one or more reflecting surfaces in a location proximate to and at a distance from the collector, and at an angle or angles other than at a right angle to the collector; the reflecting surfaces each having a reflective surface area, wherein the one or more reflectors have an entire surface area to collector surface area ratio of at least 25%, and wherein the location, displacement, and angle or angles of the one or more reflecting surfaces relative to the collector are such that an increase in the quantum of solar energy incident on the collector is achieved for a majority of sunlight hours during most days of the annual cycle.

In an embodiment the one or more reflecting surfaces are substantially immobile and planar surfaces.

In an embodiment, at least the displacement from or the angle formed between a plane of the solar collector and a plane of each of the one or more reflectors is predetermined to achieve a specific increase up to a maximum theoretical increase in the quantum of solar energy incident on the collector.

In an embodiment, determination of the displacement from or the angle formed between a plane of the solar collector and a plane of each of the one or more reflectors is based on a given latitude.

In an embodiment, said given latitude is between 60 degrees North and 60 degrees South of the Equator.

In an embodiment, determination of the displacement from or the angle formed between a plane of the solar collector and a plane of each of the one or more reflectors is based on a given angle of the solar collector from a reference plane.

In an embodiment, determination of the displacement from or the angle formed between a plane of the solar collector and a plane of each of the one or more reflectors is based on a given orientation and dimension of the collector.

In an embodiment determination of the displacement from or the angle formed between a plane of the solar collector and a plane of each of the one or more reflectors is based on a given dimension or displacement of each of the one or more reflectors from the solar collector.

In an embodiment, determination of the displacement from or the angle formed between a plane of the solar collector and a plane of each of the one or more reflectors is based on a given number of one or more reflecting surfaces used in the apparatus.

In an embodiment, the solar energy collector has a lengthwise direction and is positioned on a mounting surface having a maximum available length along said length-wise direction, wherein pre-determination of the number of reflecting surfaces is based on the maximum available length of the mounting surface.

In another aspect, the present invention provides a method of configuring a solar energy collection apparatus, the method characterised by the steps of providing one or more reflecting surfaces at a location proximate to and at a distance from a collector of solar energy, sizing the one or more reflecting surfaces and the collector such that the ratio between the entire reflective surface area of the one or more reflecting surfaces and the collector surface area is at least 25%, and orienting the one or more reflecting surfaces such that each reflecting surface is oriented at angle or angles other than at a right angle to the collector, wherein said location, displacement, and angle or angles of the one or more reflecting surfaces are chosen to cause an increase in the quantum of solar energy incident on the collector for a majority of sunlight hours during most days of the annual cycle.

In yet another aspect, the present invention provides a method of designing a solar energy collection apparatus, said method including receiving data relating to m latitude, installed angle, orientation and dimension of a collector of solar energy, receiving data relating to a dimension of or displacement of each of one or more reflecting surfaces proximate to and at a distance from the collector, determining, based on the received data, at least a displacement from or an angle formed between a plane of the solar collector and a plane of each of the one or more reflectors to achieve a specific increase up to a maximum theoretical increase in the quantum of solar energy incident on the collector compared with a quantum of solar energy incident on the collector alone.

In yet another aspect, the present invention provides a method of determining a quantum of solar radiation incident on a collector of solar energy, the collector receiving direct solar radiation from the sun and indirect radiation from one or more reflecting surfaces proximate to and at a distance from the collector, the method including receiving data relating to characteristics of a collector of solar energy including a latitude, installed angle, orientation and dimension thereof, receiving data rotating to characteristics of one or more reflecting surfaces proximate to and at a distance from the collector including a dimension of or displacement of each of the one or more reflecting surfaces, and determining, based on the received data, a quantum of solar energy incident on the collector.

In an embodiment, the method further includes receiving subsequent data relating to characteristics of the collector or one or more reflecting surfaces, wherein said subsequent data may include substitute data, and determining, based on the received data and subsequent data, a quantum of solar energy incident on the collector.

In an embodiment the method further includes displaying, on a user interface, the quantum of solar energy incident on the collector or a measure of performance derived therefrom.

In an embodiment, the method further includes receiving data relating to physical constraints associated with a mounting surface of the collector.

In an embodiment, said physical constraints include a dimension, orientation or angle of said mounting surface.

In an embodiment, said physical constraints further include adjacent structures which cause said one or more reflecting surfaces to be in shadow.

According to an aspect, the present invention provides a method of determining a quantum of solar radiation incident on a collector, the method characterised by steps including determining a position of the sun in the sky at a given latitude at a given moment or period of daylight through the year, determining an area of one or more reflecting surfaces that are positioned to reflect solar radiation to a surface of the collector at said moment or during said period assuming none of the reflecting surface is in shadow, determining an area of the one or more reflecting surfaces that is in shadow and which hence cannot reflect solar radiation to a surface of the collector at said moment or during said period, determining an area of the collector that receives direct solar radiation from the sun, and determining the quantum of solar radiation incident on the collector by adding the area of the one or more reflecting surfaces that are positioned to reflect solar radiation to the collector surface to the area of the collector receiving direct solar radiation, and subtracting the area of the one or more reflecting surfaces in shadow.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

FIG. 1 is a schematic side view of a solar energy collection apparatus in accordance with an embodiment including a collector and a single reflector, wherein a collector angle, a reflector length and angle, and an offset length and offset angle are defined.

FIG. 2 is a graph displaying total daily summer insolation falling on a collector versus reflector angle for a single reflector apparatus located at 34° S in accordance with an embodiment.

FIG. 3 is a graph displaying total daily winter insolation falling on a collector versus reflector angle for a single reflector apparatus located 34° S in accordance with an embodiment.

FIG. 4 is a graph of insolation versus offset length for a single reflector apparatus located at 34° S in accordance with an embodiment.

FIG. 5 is a graph of insolation versus time of day for a single reflector apparatus located at latitude 34° S in mid-summer (Total) compared with an un-augmented (Typical) system.

FIG. 6 is a graph of insolation versus time of day for a single reflector apparatus located at latitude 34° S in mid-winter (Total) compared with an un-augmented system (Typical).

FIG. 7 is a schematic side view of a solar energy collection apparatus in accordance with an embodiment including a collector and two reflectors, wherein a collector angle, a first reflector length and angle, a second reflector length and angle, and an offset length and offset angle are defined.

FIG. 8 is a perspective view of a solar energy collection apparatus according to an embodiment including a collector and two reflectors.

FIG. 9 is a perspective view of a solar energy collection apparatus according to an alternate embodiment including a collector and two reflectors.

FIG. 13 is a graph of insolation versus dime of day for a double reflector apparatus located at latitude 34° S in mid-summer (Total) compared with un-augmented system (Typical).

FIG. 14 is a graph of insolation versus time of day for a double reflector apparatus located at latitude 34° S in mid-winter (Total) compared with an un-augmented system (Typical).

FIG. 15 is a three-dimensional graph of total daily insolation in summer versus reflector angles for each reflector of a double reflector apparatus located at latitude 34° S.

FIG. 16 is a three-dimensional graph of total daily insolation in winter versus reflector angles for each reflector of a double reflector apparatus at latitude 34° S.

FIG. 20 is a graph of insolation versus time at day for a triple reflector apparatus located at 34° S in mid-summer (Total) compared with un-augmented system (Typical).

FIG. 21 is a graph of insolation versus time of day for a double reflector apparatus located at 34° S in mid-winter (Total) compared with an un-augmented system (Typical).

FIG. 22 is a three-dimensional graph of total daily insolation in summer versus reflector angles for second and third reflectors of a triple reflector apparatus located at latitude 34° S.

FIG. 23 is a three-dimensional graph of total daily insolation in winter versus reflector angles for second and third reflectors of a triple reflector apparatus located at latitude 34° S.

FIG. 24 is a graph of insolation versus month for a triple and quadruple reflector apparatus located at 35° S latitude.

FIG. 25 is a perspective view of a solar energy collection apparatus according to an embodiment including a collector, three reflectors and additional side reflectors.

FIG. 26a is a perspective view of a solar energy collection apparatus according to an embodiment including a plurality of substantially horizontal collectors disposed adjacent four reflective surfaces.

FIG. 26b is a perspective view of a solar energy collection apparatus according to an embodiment including a plurality of upright collectors disposed adjacent four reflective surfaces.

FIG. 27 is a perspective view of a solar energy collection apparatus according to an embodiment including two collectors and three reflectors associated with each collector, wherein the apparatus is configured for integration into a sloped surface.

FIG. 28 is perspective view of a solar energy collection apparatus according to an embodiment including a collector and three reflectors wherein the apparatus is enclosed by a glass roof.

FIG. 29 is perspective view of a solar energy collection apparatus according to an embodiment including two collectors and three reflectors associated with each collector, wherein the apparatus is configured for use along a vertical surface.

DETAILED DESCRIPTION OF THE INVENTION

Figure 10:
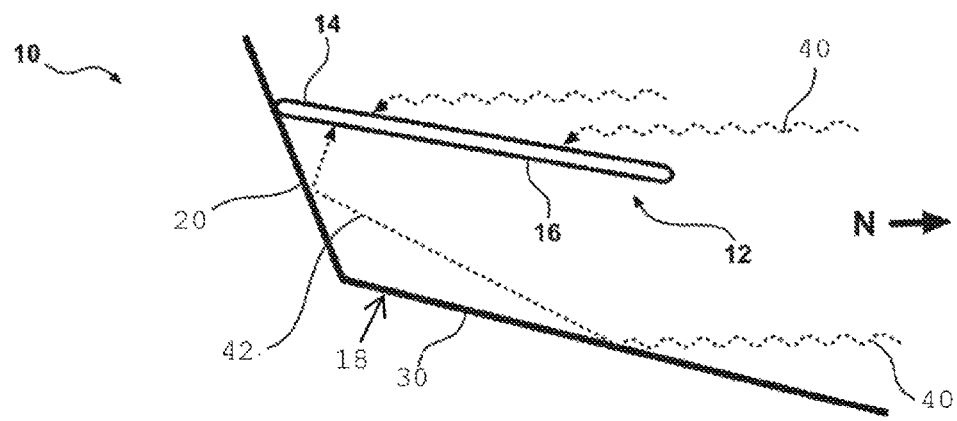
FIG. 10 is a side schematic view of a solar energy collection apparatus according to an embodiment in which the apparatus is facing north and includes a collector and two reflectors wherein the angle of incoming insolation is at, or around, the Winter solstice.

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration.

It is to be understood at the outset that reference to "reflector", "reflective surface", "reflecting surface", "reflective face", "reflective portion" or "reflective panel" herein are reference to the same or like feature being a surface, panel, etc, intended to reflect radiation. Likewise, reference to "collector" or "collector panel" are reference to the same or like feature being a collection surface tube(s), device, panel(s), etc, for collecting solar radiation. Reference to "planar" herein is intended to describe a characteristic of surface that does not focus solar radiation. Reference to "un-augmented" herein is intended to describe a solar thermal collector without associated reflective surfaces. Reference to "distance" or "displacement" herein are reference to a same or similar measure of space between one point or object from another.

According to an aspect the present invention relates to a solar energy collection apparatus 10 that increases a quantum of solar radiation incident on a collector of solar energy 121. The apparatus 10 may be characterised by the collector including first 14 and second 16 sides for collecting incoming solar radiation, and one of more reflecting surfaces 18 located procreate to and at a distance from the collector 12, and at an angle or angles other than at a rigid angle to the collector, the reflecting surfaces each having a reflective surface area. The apparatus 10 may be further characterised by the one of more reflecting surfaces having a combined reflective surface area to collector area ratio of at least 25%. The apparatus 10 may be further characterised by the location, displacement, and angle or angles of the one or more reflecting surfaces relative to the collector being such that an increase in the quantum of solar energy incident on the collector 12 is achieved for a majority of sunlight hours during most days of the annual cycle.

According to another aspect, the present invention relates to a method of manufacturing, configuring or erecting a solar energy collection apparatus including providing one or more reflecting surfaces at a location proximate to and at a distance from a collector of solar energy, sizing the one or more reflecting surfaces and the collector such that the ratio between the entire reflective surface area of the one or more reflecting surfaces and the collector surface area is at least 25%, orienting the one or more reflecting surfaces such that each reflecting surface is oriented at angle or angles other than at a right angle to the collector, wherein a location, distance, and angle or angles of the one or more reflecting surfaces are chosen to cause said increase in the quantum of solar energy.

In another aspect, the present invention relates to a method of determining a quantum of solar energy incident on a collector 12 based on received or input data. Such a method may be useful in altering the configuration of an already installed apparatus 10, or designing an apparatus 10 that is yet to be installed at a particular location. The method may be characterised by the steps of receiving data relating to known characteristics of the collector of solar energy including a latitude, angle, orientation and dimension thereof, receiving data relating to known characteristics of one or more reflecting surfaces proximate to and at a distance from the collector including a dimension of or displacement of each of the one or more reflecting surfaces from the collector, and determining, based on the received data, a quantum of solar energy incident on the collector. In an embodiment, subsequent input data which may include data that substitutes the original input data is received, and the determination of a quantum of solar energy incident on the collector may be re-calculated based on the original and/or subsequent data. The skilled addressee would thus realise that an iterative approach may be taken during design or re-design of an apparatus 10.

Other characteristics which may form part of input data include, but are not limited to, orientation relative to the equator (e.g. east-west or north-south facing), camber of a proposed installation surface, usable space (length and breadth), panel reflectivity, solar intensity, absolute collector dimensions and other collector technical specifications.

A further characteristic may be a physical constraint such as a shadow on the one or more reflective surfaces caused by the collector and/or adjacent structures during certain times of day. According to yet another aspect, the present invention provides a method of determining a quantum of solar radiation incident on a collector, with steps including determining a position of the sun in the sky at a given latitude at a given moment or period of daylight through the year, determining an area of one or mom reflecting surfaces that are positioned to reflect solar radiation to a surface of the collector at said moment or during said period assuming none of the reflecting surface is in shadow, determining an area of the one or more reflecting surfaces that is in shadow and which hence cannot reflect solar radiation to a surface of the collector at said moment or during said period, determining an area of the collector that receives direct solar radiation from the sun, determining the quantum of solar radiation incident on the collector by adding the area of the one or more reflecting surfaces that are positioned to reflect solar radiation to the collector surface to the area of the collector receiving direct solar radiation, and subtracting the area of the one or more reflecting surfaces in shadow.

Rather than a desired quantum of solar radiation incident on the collector, or other associated measure of performance, being output as a result of carrying out the method, data relating to a desired performance may be input so as to determine optimal characteristics of the collector and/or one or more reflective surfaces. In an aspect the present invention involves a method of designing a solar energy collection apparatus including receiving data relating to a latitude, installed angle, orientation and dimension of a collector of solar energy, receiving data relating to a dimension of or displacement of each of one or more reflecting surfaces proximate to and at a distance from the collector, and determining, based on the received data, at least a displacement from or an angle formed between a plane of the solar collector and a plane of each of the one or more reflectors to achieve a specific increase up to a maximum theoretical increase in the quantum of solar energy incident on the collector compared with a quantum of solar energy incident on the collector alone. The invention is not intended to be limited to any one way of determining the displacement from or angle formed between a plane of the solar collector and a plane of each of the one or more reflectors, but the following provides a detailed example with reference to single, double and triple reflector apparatus.

In the Figures and tables presented herein, the characteristics of each of the collector and one or more reflecting or reflective surfaces is referenced by symbols. For example, a solar energy collector 12 may be positioned at a latitude l and oriented at a collector angle φ. A first reflective surface 20 of the one or more reflective surfaces 18 may include a reference point that is furthest from the Equator along a near edge 22 thereof. The collector 12 may also include a reference point that is furthest from the Equator along a rear edge 24 thereof and the first reflective surface 20 may be spaced from the collector 12 by an offset length σ defined by the distance between the respective reference points. An offset angle ω may be defined by the collector reference point relative to a reference axis 26, for example, extending through the reflector reference point. The first reflective surface 20 and the solar energy collector 12 may be oriented according to an offset distance σ and offset angle ω to ensure optimal year round or part year performance at a given latitude l.

In an embodiment, the first reflective surface 20 includes a pre-calculated reflector length RL and is oriented according to a reflector angle θ. The reflector angle θ may be defined by the angle of the first reflective surface 20 relative to a reference axis 28 associated with the first reflective surface, in the embodiment shown being a horizontal axis extending through an edge 29 opposite the edge 22.

The one or more reflective surfaces 18 may include a second reflector 30, a third reflector 32, and up to n reflectors, wherein each additional reflector may include a reflector length $RL_2$, $RL_3$ . . . $RL_n$ and a reflector angle $\theta_2$, $\theta_3$ . . . $\theta_n$ defined by the angle of each reflective surface 30, 32 . . . n relative to a reference axis 34, 38 . . . n, in the embodiment shown being a horizontal axis 34, 36 . . . n extending through the edge of each surface that is farthest away from the edge 22 of the first reflector. The lengths including the offset length and RL, $RL_2$, $RL_3$ . . . $RL_n$, may be expressed in terms or as a ratio of the collector length. Whilst the reflectors are shown in some of the Figures as being adjoining, there is no specific requirement that they each join, and indeed it may be preferable to have them separated to assist in rainwater runoff as shown for example in FIG. 26.

Figure 18:
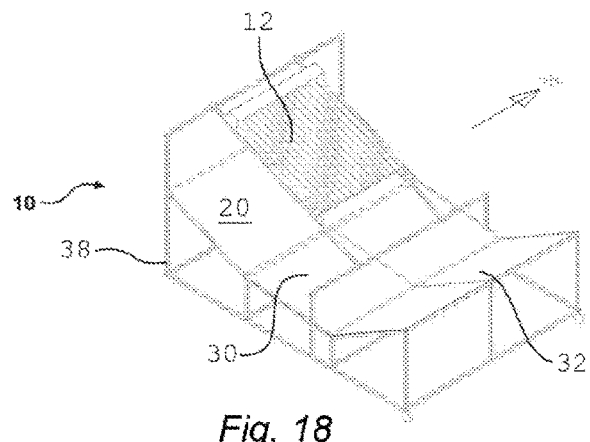
FIG. 18 is a perspective view of a solar energy collection apparatus according to an embodiment including a collector and three reflectors.
Figure 19:
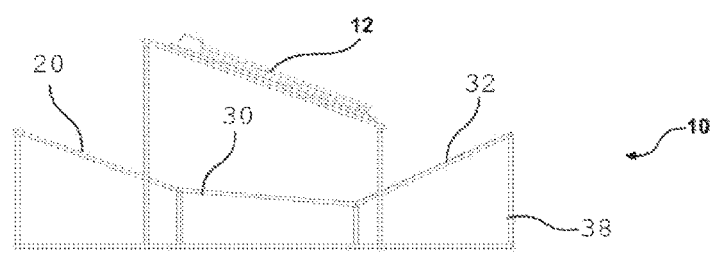
FIG. 19 is a side view of a solar energy collection apparatus according to an alternate embodiment including a collector and three reflectors.

The reader is directed to an apparatus 10 including a single reflector 20 in accordance with an embodiment in FIG. 1 with corresponding graphs shown in FIGS. 2-6, an apparatus 10 including two reflectors 20 and 30 in accordance with an embodiment in FIG. 7 with perspective views of example installations in FIGS. 8-12 and corresponding graphs in FIGS. 13-16, and an apparatus 10 including three reflectors 20, 30 and 32 in accordance with an embodiment with perspective views of example installations in FIGS. 18-19 and corresponding graphs in FIGS. 20-24. FIGS. 25-29 show various example installations in accordance with still further embodiments of the present invention. In each embodiment, the reflector(s) are deposed so as to increase insolation falling on the collector during the solar cycle, without moving the reflector positions. Different parts of the reflector(s) may produce irradiation of the first and/or second surface of the collector at different times of the day and during different times in the annual cycle.

In apparatus involving more than one reflector, the path of reflected radiation may be directly from a first reflective face to the first and/or second side of the collector, from a first to a second reflective face and then to the first and/or second side of the collector, simultaneously from two or more reflective faces to the first and/or second side of the collector, or from one and then from another to the first and/or second of the collector, at different times in the daily or annual solar cycle. This pattern of reflection is achieved without moving the position of the reflectors during the period of irradiation. The reader should however appreciate that parts of the apparatus may, in some implementations include one or more movable parts that may be motorised. For instance the reflective portions may be moveable relative to each other and in some implementations may be motorised to vary their relative angle θ, $\theta_1$, $\theta_2$, and so on.

It will become apparent from a viewing of the examples shown in FIGS. 8-12, 18-19 and 24-28 that the apparatus 10 may be configured to be mounted above a surface 37, which may be the roof of a residential home or building or other surface. The collector(s) 12 and/or reflector(s) 18 may also or alternatively be mounted on a frame 38. The reflector 18 may be rigid to thereby support the collector 12 thereon, as shown by way of example in FIG. 8. The surface 14 of the collector 12 may be configured for exposure to direct insolation as indicated by arrows 40 throughout the Figures. The surface 16 of the collector may be configured for exposure to reflected insolation from one of more of the reflective faces 18 of the reflector at any one time, as indicated by arrows 42 throughout the Figures.

In the embodiment of FIG. 8, the reflectors 18 include a first reflective face 20 and a second reflective face 30. At least some of the incoming insolation during the diurnal and annual cycles is reflected from the second reflective face 30 onto the first reflective face 20 prior to irradiating the surface 16 of the target 12. The first and second reflective faces 20 and 30 may be substantially planar to ensure that light is not focused on one point of the surface 16 of the collector 12. The present Applicant has determined that the focusing that occurs with parabolic reflectors, for example, is undesirable for use on solar panels and solar thermal devices. The reader should however appreciate that the faces may be slightly curved.

As further illustrated in FIG. 8 the collector 12 may be in the form an appropriate solar thermal device such as those available off-the-shelf in a number of different configurations. One known solar thermal collector includes a plurality of longitudinal clear glass tubes 44 each containing a heat pipe (not shown) which terminates at one and inside a manifold 46 which houses fluid to be heated. The heat pipes may contain water or other liquid such as propylene glycol. The heat from the hot end of the heat pipes is transferred to the fluid inside the manifold, which may then be stored in a hot water tank 48 via pipe 50, such as that shown in FIG. 8. The hot water may be utilized or may be transferred to another site for generating electricity, it is to be understood that the present invention is not intended to be limited to any one type of solar thermal collector. For example, solar thermal collectors in which fluid is passed directly through the tubes may also be effectively used. The collector 12 may alternatively include two single-sided photovoltaic modules (not shown) positioned in a back-to-back configuration. The upper photovoltaic module may be configured to be exposed primarily to incoming insolation end the lower photovoltaic module may be configured to resolve reflected insolation 42 from the reflective portion 18. Alternatively, a bi-facial photovoltaic module may be used.

Figure 11:
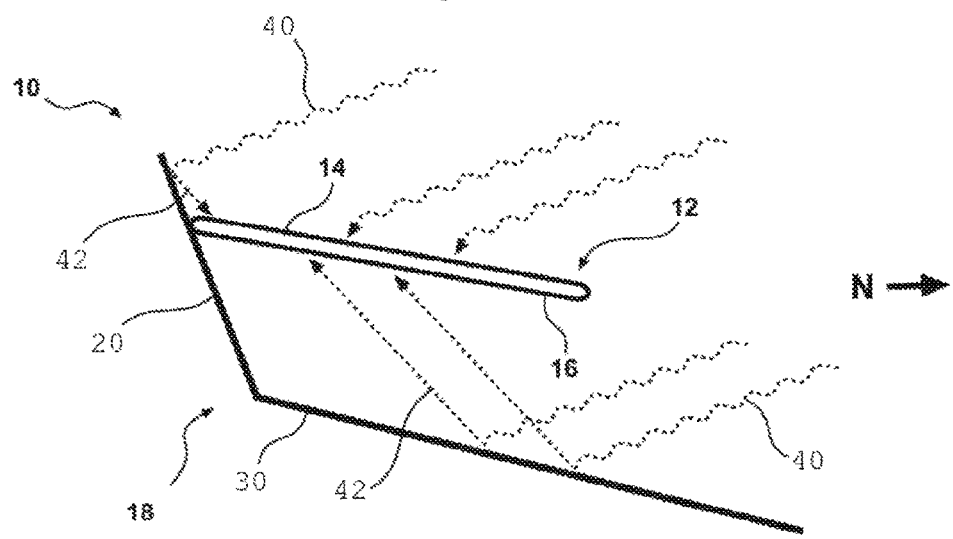
FIG. 11 is a side schematic view of the apparatus of FIG. 10 wherein the angle of incoming insolation is at, or around, the equinox.
Figure 12:
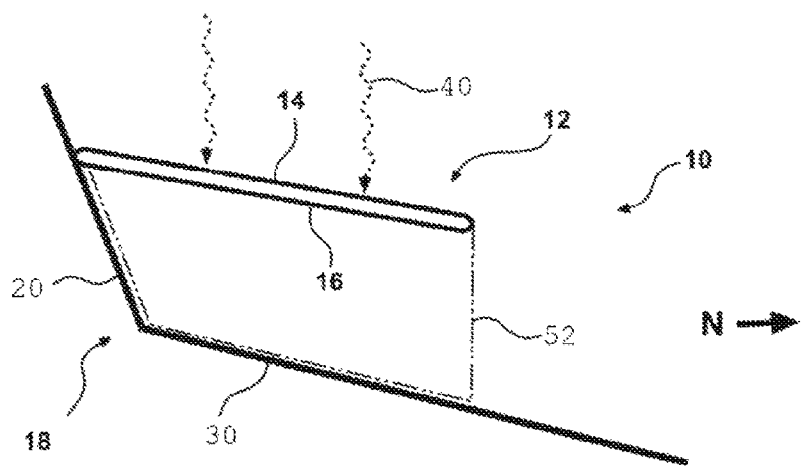
FIG. 12 is a side schematic view of the apparatus of FIG. 10 wherein the angle of incoming insolation is at, or around, the Summer solstice.

FIGS. 10 to 12 illustrate the relative angle of the insolation at three times through the annual cycle for an apparatus including two reflectors orientated north and located in the southern hemisphere for example.

FIG. 10 illustrates the general angle of the incoming insolation 40 around the time of the winter solstice, when the sun is closest to the northern horizon. At this time of the year the sun's rays arrives at a low angle. The incoming insolation 40 is then reflected off the second reflective face 30 onto the first reflective face 20 prior to irradiating the surface 16 of the target 12. This reflected insolation 42 then heats the surface 16 of the collector around the winter solstice, thereby improving the efficiency of the apparatus 10.

The reflectors 18 may be planar sheets of metal having a relatively smooth upper surface so that they provide a generally polished finish, although this is not essential. As shown in FIG. 11, at a time of the year around the equinox when the sun is higher in the sky some of the incoming insolation 40 may be reflected off one reflective face only, that is, at least the second reflective face 32 onto the surface 16 of the collector 12. Furthermore, where the first reflective surface 20 extends above the collector, and thereby altering the offset length and offset angle as shown, some of the incoming insolation 40 may be reflected from an upper portion of the first reflective surface 20 back onto the surface 14 of the collector.

As shown in FIG. 12, during or around the time of the summer solstice, when the sun is at its apex, the sun is positioned generally above the collector 12 and the reflector 30 is generally shaded as indicated by broken line 52.

As the reader will now appreciate, the surface 14 of the collector 12 may be arranged so that if is exposed primarily to incoming insolation 40. However as illustrated in FIG. 11, for example, the surface 14 can also be irradiated by reflected insolation 42 by the reflector 20 that extends above the top edge 24 of the collector 12. The surface 16 is predominantly irradiated by reflected insolation 42 from the reflector 30.

The exposure of both surfaces 14 and 16 of the collector 12 to the incoming insolation increases efficiency in that the apparatus 10 may utilize the available solar radiation. The skilled addressee will also appreciate that increases in efficiency also occur using a single reflector apparatus 10, as per the apparatus shown in FIG. 1 for example, provided that at least the offset length and offset angle between the reflector 20 and collector 12 is pre-calculated based at least on the latitude l to ensure optimal performance.

As the amount of insolation directed onto the collector 12 is increased, the temperatures reached within the tubes 44 of each collector increases likewise. This may improve the efficiency of the apparatus, meaning that the apparatus footprint or else of the collector 12 may be reduced.

As discussed earlier, a solar energy collection apparatus 10 according to an embodiment may also include third or fourth or more reflective faces 18. A third or fourth reflective face may be added with advantage, with similar patterns of irradiation meaning the surface of the collector, either from one to another and thence to the collector, simultaneously reflecting from two, three or more reflectors to the collector, or sequentially first from one and then from another to the collector, through the cycle. In general, the number of collectors 12 and reflectors 10 necessary to ensure optimal performance at any one site may be determined based upon factors in addition to a determination based solely on latitude l, for example, the maximum available space in a length-wise and/or breadth-wise direction at the site. The number of reflectors, their length and their angles may be pre-calculated based on a dimension of the available space and the latitude l. However, for any one site, the latitude l alone may provide sufficient information to derive a "useful" output. In particular, the latitude provides two angles of solar insolation at that latitude (winter and summer solstice angles). Based on these two angles, the collector angle, offset length and offset length may be determined, as well as the length and angle of the one or more reflectors 18.

The active area of the reflector or reflectors is able to be defined for any specified latitude in such a way that the orientation of a portion of a reflecting surface permitting a direct reflected path to a surface of the collector at one time of the day or year can also produce an indirect reflected path for insolation reaching the surface of the collector via a second reflective surface at another time of the day or year. For certain positions of the reflective surfaces, one portion of the surface reflects insolation to a surface of the collector at one time of the day or the year, while another portion of the reflecting surface reflects insolation to the surface of the collector at another time of the day or year. In this way, the surface of the collector is continuously exposed to reflected insolation by one or more than one path, as the sun moves across the sky during the course of each day, an effect identical to moving the collector and/or reflecting surfaces to maintain insolation intensity on the collector, but without the requirement to move either the reflecting surfaces or the collector. The apparatus effectively tracks the sun without moving parts.

The planar nature of the reflective surfaces was described earlier. This ensures the intensity of the reflection from the planar reflective faces in the system when measured normal to the reflected radiation from any portion of the apparatus 10 does net exceed the intensity of five primary incoming radiation measured normal to the direct insolation. There is therefore no potential for the development of "hot spots" in parts of the collector as the incoming solar radiation is not focused to produce a greater intensity at any point than the intensity of the incoming radiation. The total intensity of insolation to some points of the collector is increased where there is more than one path for incoming radiation to reach the collector. The net result is that the radiation reaching the collector is increased up to three fold, without being focused to a localized zone of increased thermal energy. Because there is no focusing by the reflecting surfaces, the faces can be arranged to reflect insolation to the surface of the collector at different times of the solar cycle without moving.

The inventor has recognized that that the apparatus 10 as compared against existing apparatus can be up to six times more efficient in early Spring. In a comparison test between an unaugmented system and the apparatus 10 of the present invention in a test performed at 34° S in early Spring it was found that the total energy collected by the collector increased from 6 MJ per day to 48 MJ per day.

It has also been found that the use of the reflector(s) results in higher temperatures being reached earlier in the day and maintained for a longer duration each day than these of existing systems. This produces more energy per day per target, thus improving the utility of the apparatus.

Testing has shown that the three collector system offers a worthwhile improvement, notably in the summer months. As systems employ greater numbers of reflectors, the overall performance of the system tends to increase, however it is expected that the additional complexity of adding more/smaller reflectors may outweigh the benefits. FIG. 24 compares the performance of three or four reflector apparatus at 35° latitude and shows that a fourth reflector can offer approximately a 10% performance improvement in spring and autumn.

Testing has also shown that there is a greater gain to be had moving from one to two reflectors than from two to three reflectors. The same gain is seen moving from three reflectors to a particular four reflector design, specifically optimised for latitude (34° S).

Figure 17:
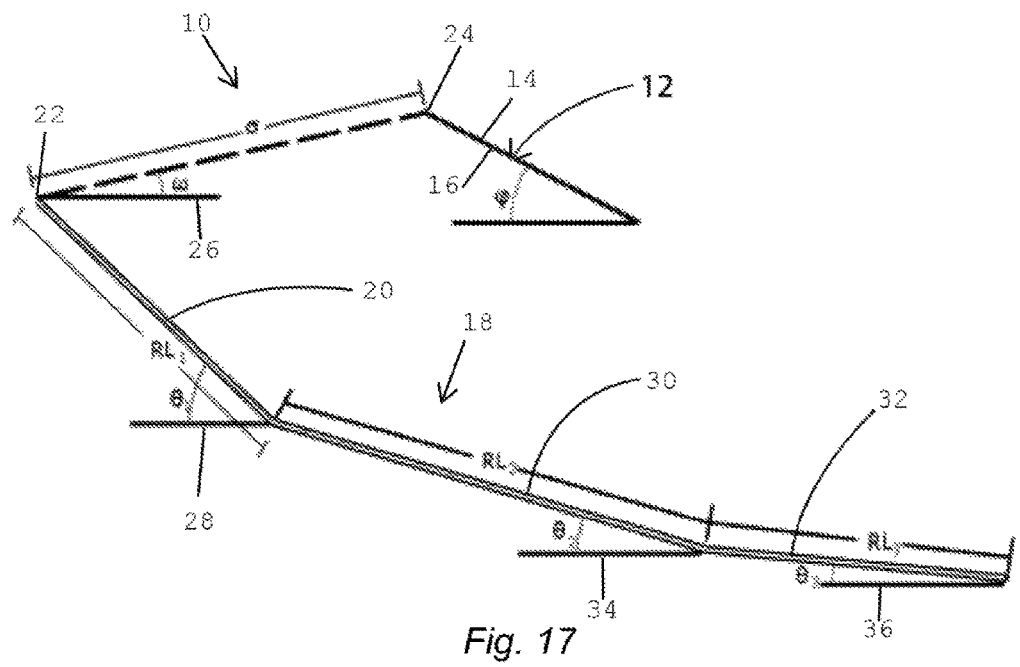
FIG. 17 is a schematic side view of a solar energy collection apparatus including a collector and three reflectors, wherein a collector angle, a first reflector length and angle, a second reflector length and angle, a third reflector length and angle, and an offset length and offset angle are defined.

Before turning to the various graphs associated with each of the single, double and triple reflector apparatus shown by way of example in FIGS. 1, 7 and 17, the reader is directed to FIGS. 25-28 which illustrate further embodiments of apparatus 10. Some of these embodiments illustrate collector/reflector configurations which have been designed to account for other factors increase accuracy and/or utility. Such factors may include, but are not limited to, the orientation relative to the equator (e.g. east-west or north-south facing), camber of a proposed installation surface, usable space (length and breadth), panel reflectivity, solar intensity, absolute collector dimensions and other collector technical specs.

For example, the single collector, triple reflector apparatus 10 shown in FIG. 25, which is north-facing in the southern hemisphere, includes a fourth face 52 and fifth face 54. The fourth and fifth faces 52 and 54 may be positioned to either side of the first, second and third faces to reflect insolation when the sun is close to the horizon. In this way, further reflected insolation 42 can be directed towards the surface 16 soon after dawn 56 and/or prior to dusk 58. Of course, rather than having separate faces, the existing faces 20, 30 and 32 may simply be manufactured to have an increased breadth-wise dimension, it has been shown that a reflector breadth of 3 times that of the collector is a practical maximum, with any further increase in width offering minimal return for the extra material and space required. The fourth and fifth faces can also compensate for changes in the solar azimuth angle throughout the year when the apparatus is positioned in a generally east-west orientation, for example.

The fourth and fifth faces 52 and 54 may reflect the insolation directly onto the surface 18 of the collector 12, as illustrated in FIG. 25, or the insolation may be reflected onto one of the other reflective faces 20, 30 and 32 prior to irradiating the surface 18 of the collector 12.

The apparatus 10 of FIG. 28 illustrates a bank or series of collectors 12 positioned above an extended set of four reflective faces of length RL to $RL_4$ and angles 0 to $0_4$. It is evident in this embodiment that a reflective face may consist of a number of panels depending on the required dimension of the face as opposed to a single panel.

The apparatus 10 may be manufactured to suit a range of roof gradients and configured to accommodate roof surfaces facing north, east, west or south or therein between. In this way an installer of the apparatus can select the configuration that best suits the environment. While many of the examples shown, the apparatus is located in the southern hemisphere and hence the reflectors are facing north, the apparatus can work equally well at similar latitudes in the northern hemisphere with the reflectors facing south.

The apparatus 10 of the invention may also form integral parts of structures such as homes and buildings. FIG. 27 shows an apparatus 10 according to an embodiment where in the apparatus 10 is integrated into the building structure (roof) and includes two collectors 12 (which may be elevated by a frame or similar supporting component that is not shown) and a reflector 18 disposed there beneath including three reflective faces 20, 30 and 32 for each collector. The reflector 18 is configured to be integrated into the sloping roof of the structure. Depending upon the size of the roof, the apparatus 10 may include less or more than the two collectors shown. Not only can the reflector 18 be retrofitted to an existing sloping roof, it may be integrated into newly built roof structures.

FIG. 18 illustrates an apparatus 10 housed inside a translucent roof structure 60. It is to be understood that any means of protecting or increasing/intensifying insolation towards the collector(s) 12 and/or reflector(s) 18, such as the use of a glass roof in FIG. 27, is considered within the scope of the present invention. Therefore, in a new building installation, the entire apparatus 10 could be enclosed within a roof structure that is translucent to incoming solar radiation and allow installation of the apparatus in adverse climatic locations including areas exposed to high wind conditions, hail, or snow where the apparatus can be damaged by adverse environmental conditions. Such a structure may also be useful in hiding the apparatus 10 in the event it is not considered aesthetically pleasing.

FIG. 29 demonstrates an embodiment wherein a similarly configured apparatus 10 with three reflective faces mounted to a vertical face of a structure, demonstrating the invention is not intended to be limited to horizontal or sloping roof tops but also vertical walls and the like in areas with sufficient insolation.

It is to be understood that the present invention may have utility in applications other than those described herein. A still further application may involve the apparatus 10 being mounted to a truck or other mobile vehicle which may transport the apparatus to a specified location in order to collect solar energy and thereby act as a portable hot water supply means, for example.

As discussed, another aspect of the invention is the method of designing a solar energy collection apparatus 10 and allows for iterative variation by the user of various factors which will affect the end design and overall performance. The various determinations described in relation to the size and orientation of each of the collector and reflective faces may be based on known data to which a computer processor carrying out the method of the invention has access. Such data may be based on previous testing of different configurations at different latitudes, and may be updated as more test data is collected. The data that is used and referenced in the determination steps may be data that ensures optimal performance according to latitude to maximise, for example, any one of winter heat collection, year round energy collection, and summertime energy collection.

A computer processor may be used to calculate the position of the sun above horizon and hence the angles of solar insolation, for the particular latitude and for a particular time of the day and time of year, according to well-known formulae, or alternatively such data may be derived from published tables and stored in a memory of the computer processor. The processor may also include a keyboard and user interface or display or other means of enabling a user to input position and other data required to enable the processor to output a recommended design and/or measure of performance of the specified design.

A graphical representation of the active reflector area may be used to visualise the effect of changes made. This may assist, for example, to identify areas or components which may be increased or decreased in size to best utilise the available space through means of a display of one or more views of the system with the reflective contributions shown.

The graphs presented in FIGS. 2-6 for a single reflector apparatus, FIGS. 13-16 for a double reflector apparatus, and FIGS. 20-23 for triple reflector apparatus, explore how performance varies as one or two parameters are varied whilst others fixed at demonstrative values, often optimal values. It is this data which the computer processor may access in order to make the various determinations described in the method embodying the present invention. The optimal values may be chosen with the aid of further graphs or equations derived therefrom. It is obviously an iterative process to determine all optimal values to be used Unless otherwise stated the apparatus end graphs discussed are optimised for total annual insolation.

FIG. 4 shows the effect of reflector offset length σ for an apparatus located at latitude 34° S with other parameters optimised. Optimal performance is achieved when the offset length is approximately equal to the collector length.

FIG. 2 shows total daily summer insolation falling on a collector versus reflector angle for a system located at 34° S. Insolation is shown as a percentage of the yearly average insolation for an unaugmented collector. Three curves are shown to also demonstrate the effect of differing offset angle ω. The reflector length is set sufficiently large to have no influence. Notably the curves have two peaks, the highest left hand peak is for a reflector that would reflect sun that is high in the sky around midday, whereas the right hand side peak is for a reflector that operates early and late in the day when the sun is lower in the sky and is seen to be far more effective. Similarly FIG. 3 shows total daily winter isolation. The winter improvement is seen to be much less than that for summer. This is to be expected as apparatus used in the test from which these results were generated was designed for maximum yearly performance and therefore favours summer performance when there is more sunlight.

From test data used in the graphs described above equations for optimal parameters for maximum yearly gain, for example, can be derived. Table 1 below summarises such equations for a latitude l of 34° S.

TABLE 1

Examples of design parameter equations for optimised yearly performance for a single reflector system located at 34° S

| Parameter | Equation for latitude l |
|---|---|
| Collector Angle | $\varphi = 0.49l + 24.8$ |
| Reflector Length | $RL = 0.002l + 2.35$ |
| Reflector Angle | $\theta = 0.633l + 20.9$ |
| Offset Length | $\sigma = -0.01l + 1.8$ |
| Offset Angle | $\omega = 0.0005l^3 - 0.06l^2 + 1.7l + 12.5$ |

The graphs of FIGS. 5 and 6 demonstrate the performance of a single reflector system optimised for year round performance at a latitude of 34° S as per Table 1. In each series of graphs the performance of a system is compared with that of an un-augmented system facing north with the collector angle set to the latitude. The graphs show insolation versus time of day for mid-summer and insolation versus time of day for mid-winter. A performance improvement of approximately 60% over an un-augmented system can be seen.

FIGS. 15 and 16 show total daily insolation versus the two reflector angles for summer and winter respectively for a system at latitude 34° S. A determination of reflector angles may be made on the basis of an optimal angles shown in these graphs, and a particular graph or data therefrom may be selected depending on the time of year that is desired to be optimised.

Table 2 below summarises example equations for a double reflector apparatus located at latitude l.

TABLE 2

Example design parameter equations for optimised yearly performance for a double reflector apparatus located at latitude l

| Parameter | Equation for latitude l |
|---|---|
| Collector Angle | $\varphi = 0.49l + 24.8$ |
| Reflector 1 Length | $RL_1 = -3 \times 10^{-6}l^3 + 5 \times 10^{-4}l^2 - 0.03l + 1.69$ |
| Reflector 2 Length | $RL_2 = 8 \times 10^{-6}l^3 - 9 \times 10^{-4}l^2 + 0.03l + 1.33$ |
| Reflector 1 Angle | $\theta_1 = 0.45l + 34.3$ |
| Reflector 2 Angle | $\theta_2 = 15.24 \ln l - 25.8$ |
| Offset Length | $\sigma = 7 \times 10^{-6}l^2 - 0.01l + 1.25$ |
| Offset Angle | $\omega = -10.4 \ln l + 49.3$ |

The graphs of FIGS. 13 and 14 demonstrate the performance of a double reflector apparatus optimised for year round performance at latitude 34° S as per Table 2. In each graph the performance of a system is compared with that of an un-augmented system facing north with the collector angle set to the latitude. The graphs show insolation versus time of day for mid-summer insolation versus time of day for mid-winter; and daily total insolation throughout the year. The performance of the double collector apparatus is approximately double that of an un-augmented system.

FIGS. 22 and 23 show total daily insolation versus reflector 2 and reflector 3 angles for summer and winter respectively for a system at latitude 34° S. A determination of reflector angles may be made on the basis of optimal angles shown in these graphs, and a particular graph or data therefrom may be selected depending on the time of year that is desired to be optimised. For these graphs all other parameters have been optimised for year round performance.

Equations for optimal parameters for maximum yearly gain can be derived, and Table 3 below summarises examples of such equations.

TABLE 3

Example design parameter equations for optimised yearly performance for a triple reflector apparatus located at latitude l

| Parameter | Equation for latitude l |
|---|---|
| Collector Angle | $\varphi = 6 \times 10^{-4}l^3 - 0.07l^2 + 2.8l - 2.44$ |
| Reflector 1 Length | $RL_1 = -2 \times 10^{-6}l^3 + 4 \times 10^{-4}l^2 - 0.025l + 1.35$ |
| Reflector 2 Length | $RL_2 = 6.7 \times 10^{-6}l^3 - 7.5 \times 10^{-4}l^2 - 0.02l + 1.05$ |
| Reflector 3 Length | $RL_3 = -2 \times 10^{-6}l^3 + 20 \times 10^{-4}l^2 + 0.05l + 1.35$ |
| Reflector 1 Angle | $\theta_1 = 0.47l + 34.3$ |
| Reflector 2 Angle | $\theta_2 = 16 \ln l + 27.1$ |
| Reflector 3 Angle | $\theta_3 = 11.5 \ln l + 25.65$ |
| Offset Length | $\sigma = 7 \times 10^{-6}l^2 - 0.01l + 1.25$ |
| Offset Angle | $\omega = -10.4 \ln l + 49.3$ |

FIGS. 20 and 21 demonstrate the performance of apparatus optimised for year round performance (in accordance with Table 3). The performance of the system has marked mid-morning and mid-afternoon peaks as the collector will shade the reflectors.

The preceding description has focused on systems optimised for total year round performance. Such systems are biased towards summer performance as there is more summer insolation available to be boosted. It may however be desirable to maximise the performance boost in winter, for example when extra hot water may be needed for heating purposes. By similar considerations and calculations, component lengths and angles optimised for winter performance can be determined but are not described in detail herein for the purpose of brevity. In brief, it has been shown that in comparison with the yearly optimised system the winter performance is increased by almost 50% at midday in winter, but at the cost of reduced summer performance. The insolation is also more consistent throughout the year, however the total insolation for the year is reduced by approximately 9% at mid latitudes.

It is possible to increase the total annual insolation of a system by changing component values during the year, i.e. using yearly optimised values daring summer and winter optimised values during winter (the summer and yearly optimised values are very similar, as optimising for summer when there is the most natural insolation produces the largest overall improvement). Changing some of the values may result in useful increases in performance. From a practical perspective the angles are easiest to change and the $RL_1$ and $RL_3$ lengths can always be set to the maximum of the summer and winter requirements.

The skilled addressee would realise that in order to change the angle θ of the first reflector 20, which may come about as a result of a sloping roof or the like upon which the first reflector will sit, the collector position must be re-defined as changing θ will change the position of the collector relative to the second 30 and third reflectors 32. Thus, equations such as those presented above which may be used in the determination steps of the present method may indeed change as different values are input by a user as part of an iterative design process.

The reader will now appreciate the benefits of the present invention which provides a solar energy collecting apparatus that vastly increases the insolation incident on a solar collector. The arrangement of the reflectors effectively tracks the sun across the sky without the need for moving parts.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:

1. A solar energy collection apparatus to increase a quantum of solar radiation incident on a collector of solar energy, said apparatus comprising:
   two reflecting surfaces in a location proximate to and below the collector, and at an angle or angles other than at a right angle to the collector, the reflecting surfaces each having a reflective surface area; wherein each of the two reflecting surfaces is planar; and wherein each of the two reflecting surfaces is mounted in a fixed orientation and a fixed orientation relative to the collector;
   the collector adapted to receive solar radiation on a top surface of the collector directly from the sun and whereby the relative positioning of the two reflectors causes reflected solar radiation to be, depending on the time of the year either:
   (a) not reflected from either of the two reflectors to an underside surface of the collector; or
   (b) reflected from a first of the two reflectors to the underside surface of the collector; or
   (c) reflected from the first of the two reflectors to a second of the two reflectors and then onto the underside surface of the collector.

2. The solar energy collection apparatus according to claim 1 wherein the two reflecting surfaces are substantially immobile.

3. The solar energy collection apparatus according to claim 1 wherein at least the displacement from or the angle formed between a plane of the solar collector and a plane of each of the two reflectors is pre-determined to achieve a specific increase up to a maximum theoretical increase in the quantum of solar energy incident on the collector.

4. The solar energy collection apparatus according to claim 3 wherein determination of the displacement from or the angle formed between a plane of the solar collector and a plane of each of the two reflectors is based on a given latitude, wherein said given latitude is from about 60 degrees North to about 60 degrees South of the Equator.

5. The solar energy collection apparatus according to claim 4 wherein the determination of the displacement from or the angle formed between a plane of the solar collector and a plane of each of the two reflectors is based on:
   (a) a given angle of the solar collector from a reference plane; or
   (b) a given orientation and dimension of the collector.

6. The solar energy collection apparatus according to claim 4 wherein the determination of the displacement from or the angle formed between a plane of the solar collector and a plane of each of the two reflectors is based on:
   (a) a given orientation and dimension of each of the two reflectors from the collector; or
   (b) a given number of one or more reflecting surfaces used in the solar energy collection apparatus.

7. The solar energy collection apparatus according to claim 6, wherein the solar energy collector has a length-wise direction and is positioned on a mounting surface having a maximum available length along said length-wise direction, wherein pre-determination of the number of reflecting surfaces is based on the maximum available length of the mounting surface.

8. The solar energy collection apparatus according to claim 1, wherein the one or more reflectors have an entire surface area to collector surface area ratio of at least 25%; and wherein the location, displacement, and angle or angles of the one or more reflecting surfaces relative to the collector are such that an increase in the quantum of solar energy incident on the collector is achieved for a majority of sunlight hours during most days of the annual cycle.

9. The solar energy collection apparatus according to claim 1, wherein the collector contains a fluid to be heated.

10. The solar energy collection apparatus according to claim 1, further comprising a third reflector.

11. The solar energy collection apparatus according to claim 1, wherein the two reflecting surfaces comprises a first reflecting surface and a second reflecting surface; and wherein the first and second reflecting surfaces are fixedly engaged with each other.

12. The solar energy collection apparatus according to claim 11, wherein the first and second reflecting surfaces are fixedly oriented at an obtuse angle relative to each other.

13. The solar energy collection apparatus according to claim 11, wherein one end of the first reflecting surface is connected to an end of the second reflecting surface.

14. A method of configuring a solar energy collection apparatus, the method comprising steps of:

providing two planar reflecting surfaces at a location proximate to and directly below a collector of solar energy;

mounting both of the reflecting surfaces in a fixed position and at a fixed orientation relative to the collector;

sizing the two reflecting surfaces and the collector such that a ratio between an entire reflective surface area of the two reflecting surfaces and a collector surface area is at least 25%;

positioning the collector such that the collector will receive solar radiation on a top surface of the collector directly from the sun;

mounting the two reflecting surfaces such that each reflecting surface is oriented at an angle or angles other than at a right angle to the collector; and positioning the two reflectors relative to each other such that solar radiation reflected therefrom, depending on the time of the year is either:

(a) not reflected from either of the two reflectors to an underside surface of the collector; or (b) reflected from a first of the two reflectors to the underside surface of the collector; or (c) reflected from the first of the two reflectors to a second of the two reflectors and then onto the underside surface of the collector.

15. The method according to claim 14, further comprising choosing said location, displacement and angle or angles of the two reflective surfaces to cause an increase in the quantum of solar energy incident on the collector for a majority of sunlight hours during most days of the annual cycle.

* * * * *